(12) United States Patent  (10) Patent No.: US 7,640,599 B2
Amsel  (45) Date of Patent: Jan. 5, 2010

(54) BIB FOR ILLUSTRATING AN INFANT'S LAST FEEDING TIME

(76) Inventor: Rifky Amsel, 84 Broadway 1-D, Brooklyn, NY (US) 11211

( * ) Notice: Subject to any disclaimer, the term of this patent is extended or adjusted under 35 U.S.C. 154(b) by 0 days.

(21) Appl. No.: 12/012,075

(22) Filed: Jan. 31, 2008

(65) Prior Publication Data

US 2008/0189823 A1 Aug. 14, 2008

Related U.S. Application Data

(60) Provisional application No. 60/888,578, filed on Feb. 7, 2007.

(51) Int. Cl.
*A41B 13/10* (2006.01)
(52) U.S. Cl. ......................................................... 2/49.1
(58) Field of Classification Search ........................ 2/48, 2/49.1–49.5, 51, 75, 80, 111, 115, 69, 69.5, 2/46, 50, 52, 88, 94, 102, 104, 118–120; 434/304; 40/586; D2/860–864, 776, 777, D2/844
See application file for complete search history.

(56) References Cited

U.S. PATENT DOCUMENTS

| | | | |
|---|---|---|---|
| 1,858,153 A * | 5/1932 | Hammond | .................. 434/304 |
| D171,985 S * | 4/1954 | Spooner | .................... D10/124 |
| 2,706,378 A * | 4/1955 | Goldman | ...................... 368/98 |
| 2,749,555 A * | 6/1956 | Oliveira | ....................... 40/329 |
| 4,846,689 A * | 7/1989 | Day | ........................... 434/168 |
| 5,957,692 A * | 9/1999 | McCracken et al. | ......... 434/159 |
| 2002/0108162 A1* | 8/2002 | Bolds-Leftridge | ............ 2/49.1 |
| 2005/0241043 A1* | 11/2005 | Willis | .......................... 2/49.1 |

\* cited by examiner

*Primary Examiner*—Amy B Vanatta
(74) *Attorney, Agent, or Firm*—James Ray & Assoc

(57) ABSTRACT

A bib for illustrating an infant's last feeding time, including a cover member for covering a predetermined portion of at least one of an infant and an infant's clothing. The cover member being manufactured from a first predetermined material and having a first predetermined size and first predetermined shape. A securing mechanism is operably connected to such cover member at predetermined location thereon for securing such cover member at least one of around such infant's neck, to such infant and to such infant's clothing. Indicia is formed on such cover member illustrating predetermined information relating to a last feeding time of such infant. An indicator mechanism is disposed on such cover member for indicating such infant's last feeding time.

4 Claims, 3 Drawing Sheets

US 7,640,599 B2

BIB FOR ILLUSTRATING AN INFANT'S LAST FEEDING TIME

CROSS REFERENCE TO RELATED APPLICATION

This patent application is related to and claims priority from U.S. Provisional Patent Application Ser. No. 60/888,578 filed Feb. 7, 2007.

FIELD OF THE INVENTION

The present invention relates, in general, to bibs and, more particularly, this invention relates to devices which provide care givers of infants a way to record the time of an infant's last meal.

BACKGROUND OF THE INVENTION

Prior to the conception and development of the present invention, bibs, as are generally well known in the prior art, have been used to keep an infant's clothing clean during feeding times. However, no bibs exist which incorporate a means for such infant's care provider to record the time of such infant's last feeding such that the care provider and others have a quick and easy to reach reference upon which to rely in anticipating when such infant will need fed again as opposed to waiting for such infant to signal hunger by crying or fussing thereby creating a situation which can be stressful to both care providers and such infant.

SUMMARY OF THE INVENTION

The present invention provides a bib for illustrating an infant's last feeding time. Such bib includes a cover member for covering a predetermined portion of an infant's clothing. Such cover member being manufactured from a first predetermined material and having a first predetermined size and first predetermined shape. A securing means is operably connected to such cover member at a predetermined location thereon for securing such cover member at least one of around such infant's neck, to such infant and to such infant's clothing. Indicia is formed on such cover member for illustrating predetermined information relating to a last feeding time of such infant. An indicator means is disposed on such cover member for indicating such infant's last feeding time.

OBJECTS OF THE INVENTION

It is, therefore, one of the primary objects of the present invention to provide a bib which includes a means for recording an infant's last feeding time.

Another object of the present invention is to provide a bib which will permit an infant's care provider to anticipate a time when such infant will need to be fed.

Still another object of the present invention is to provide a device which will alleviate some of the stress involved in caring for an infant.

Yet another object of the present invention is to provide a device which will make an infant more comfortable by enabling such infant's care providers to be more aware of such infant's feeding needs.

An additional object of the present invention is to provide a device to aid in the care of infants which is easy to manufacture and can be purchased by consumers at a reasonable cost.

In addition to the various objects and advantages of the present invention described with some degree of specificity above it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
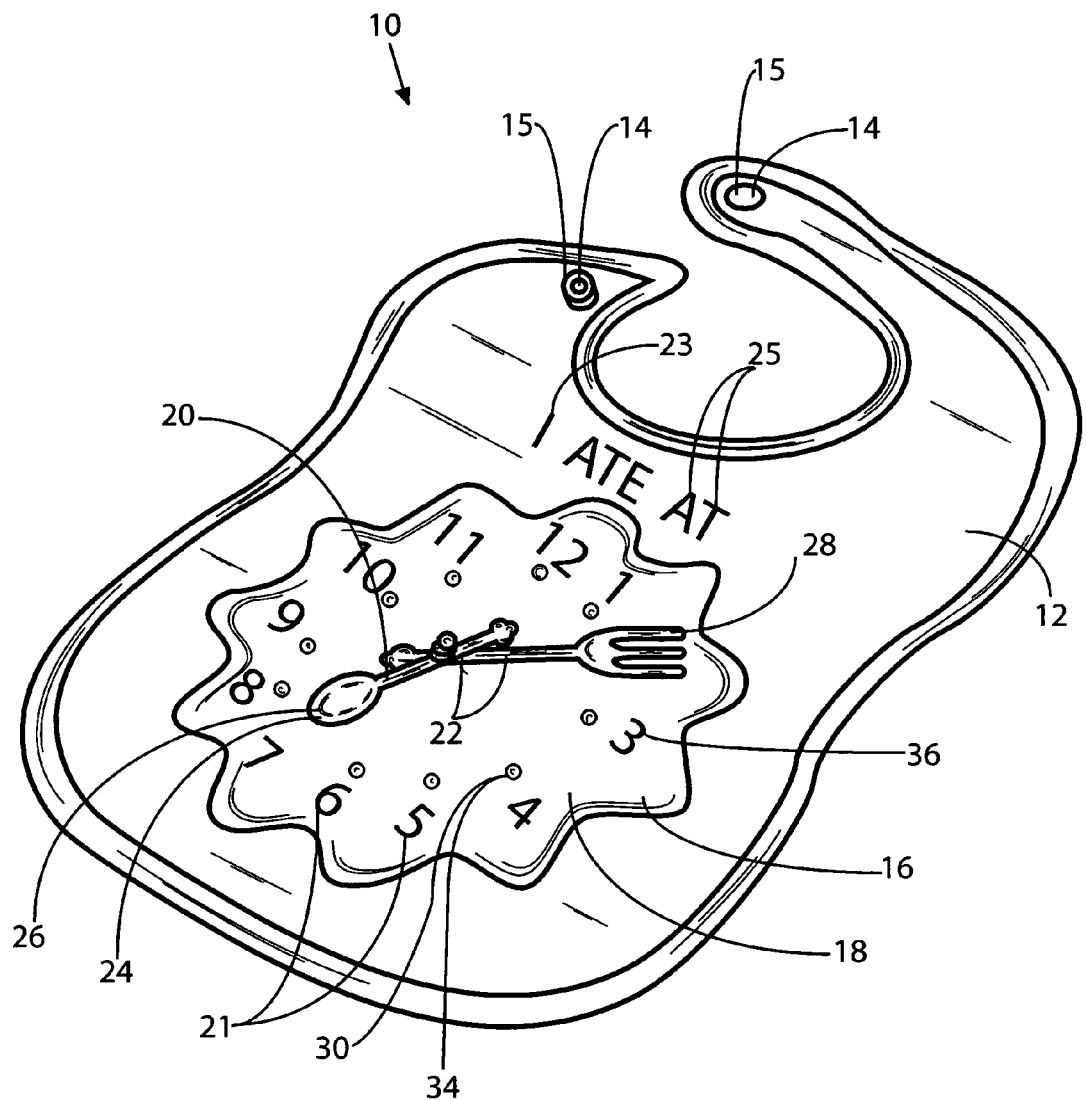
FIG. 1 is a partial perspective view of the invention according to one embodiment.

BRIEF DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures.

Figure 2:
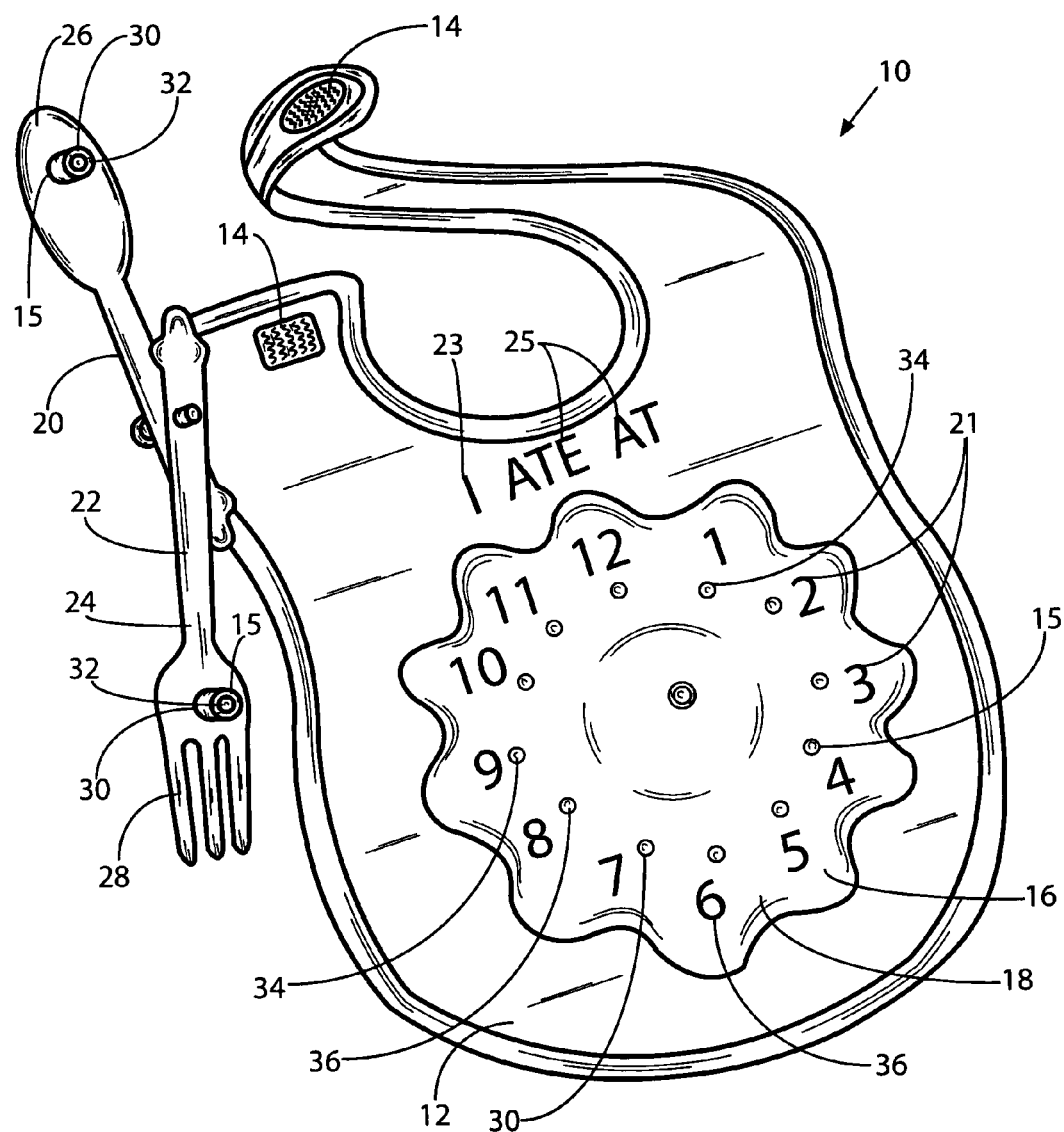
FIG. 2 is a partial perspective view of the invention according to a one embodiment.
Figure 3:
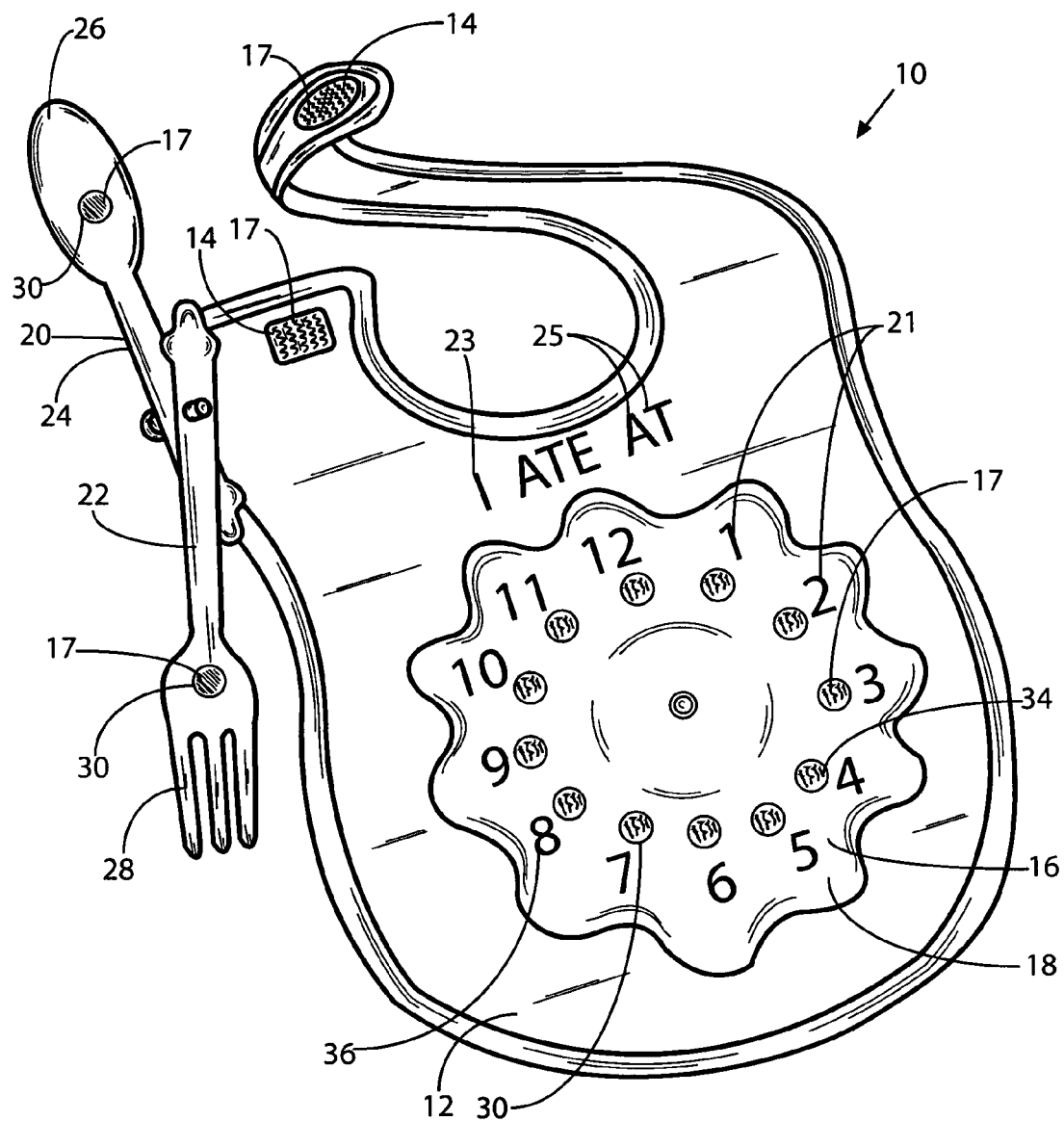
FIG. 3 is a partial perspective view of the invention according to one embodiment.

Reference is now made, more particularly, to FIGS. 1-3. A bib, generally designated 10, for illustrating an infant's last feeding time is provided. Such bib includes a cover member 12 for covering a predetermined portion of at least one of an infant and an infant's clothing. Such cover member 12 is manufactured from a first predetermined material and has a first predetermined size and a first predetermined shape. It is presently preferred that such first predetermined material is selected from the group consisting of plastic and fabric.

A securing means 14 is operably connected to such cover member 12 at a predetermined location thereon for securing such cover member 12 at least one of around such infant's neck, to such infant and to such infant's clothing. It is presently preferred that such securing means 14 is at least one of snaps 15, buttons, and a hook and loop type securing means 17.

Indicia 16 is formed on such cover member 12 for illustrating predetermined information relating to a last feeding time of such infant. It is presently preferred that such indicia 16 includes at least a face of a clock 18. It is further presently preferred that such indicia 16 further includes at least one of numbers 21, letters 23, words 25, pictures, and symbols.

An indicator means 20 is removeably disposed on such cover member 12 for indicating such infant's last feeding time. It is presently preferred that such indicator means 20 is a pair of rotateable arm members 22, having a second predetermined shape and a second predetermined size and being manufactured from a second predetermined material, such pair of arm members 22 being operably connected to such cover member 12. It is presently preferred that such second predetermined material is selected from the group consisting of metal, plastic and fabric.

It is further presently preferred that such rotatable arm members 22 are formed as hands 24 of such clock 18 such that a user can move the hands 24 of such clock 18 to a position indicative of a time of such infant's last feeding. It is presently most preferred that the hands 24 of such clock 18 are formed such that a first one of the hands 24 of such clock 18 is shaped as a spoon 26 and a second one of the hands 24 of such clock 18 is shaped as a fork 28.

It is presently preferred that such bib 10 further includes a fastening means 30 having a first portion 32 disposed on a predetermined side of each of said hands 24 and a second portion 34 disposed on said cover member 12 adjacent each number 36 on said clock 18. It is presently preferred that such fastening means 30 is at least one of snaps 15, buttons, and a hook and loop type fastening means 17.

While a presently preferred and various alternative embodiments of the present invention have been described in sufficient detail above to enable a person skilled in the relevant art to make and use the same it should be obvious that various other adaptations and modifications can be envisioned by those persons skilled in such art without departing from either the spirit of the invention or the scope of the appended claims.

I claim:

1. A bib for illustrating an infant's last feeding time, said bib comprising,
    a. a cover member for covering a predetermined portion of at least one of an infant and an infant's clothing, said cover member being manufactured from a first predetermined material and having a first predetermined size and first predetermined shape;
    b. a securing means operably connected to said cover member at a predetermined location thereon for securing said cover member at least one of around such infant's neck and to such infant's clothing;
    c. indicia formed on said cover member illustrating predetermined information relating to a last feeding time of such infant; and
an indicator means removeably disposed on said cover member for indicating such infant's last feeding time;
wherein said indicia includes at least a face of a clock;
wherein said indicator means is a pair of rotateable arm members, having a second predetermined shape and a second predetermined size and being manufactured from a second predetermined material, said pair of arm members being operably connected to said cover member;
wherein said rotateable arm members are formed as hands of said clock such that a user can move said hands of said clock to a position indicative of a time of such infant's last feeding;
wherein said bib further includes a fastening means having a first portion disposed on a predetermined side of each of said hands and a second portion disposed on said cover member adjacent each number on said face of said clock.

2. A bib for illustrating an infant's last feeding time, according to claim 1 wherein said fastening means is at least one of snaps, buttons, and a hook and loop type fastening means.

3. A bib for illustrating an infant's last feeding time according to claim 1 wherein said first predetermined material is selected from the group consisting of plastic and fabric.

4. A bib for illustrating an infant's last feeding time according to claim 1 wherein said securing means is at least one of snaps, buttons, and a hook and loop type securing means.

* * * * *